United States Patent [19]
Torras, Sr.

[11] Patent Number: 6,138,444
[45] Date of Patent: Oct. 31, 2000

[54] GROUND CLEARING BRUSH CUTTER AND MULCHER WITH A RIGID HEIGHT ADJUSTMENT MECHANISM

[76] Inventor: Robert M. Torras, Sr., 101 Gould St., St. Simons Island, Ga. 31522

[21] Appl. No.: 09/053,267

[22] Filed: Apr. 1, 1998

[51] Int. Cl.⁷ .............................. A01D 34/66; A01D 34/82
[52] U.S. Cl. .................................... 56/6; 56/14.7; 56/17.2; 56/320.1
[58] Field of Search .................................. 56/10.8, 10.9, 56/11.9, 11.2, 6, 320.1, 320.2, 16.2, 17.2, 14.7

[56] References Cited

U.S. PATENT DOCUMENTS

| | | | |
|---|---|---|---|
| 1,663,250 | 3/1928 | Graham . | |
| 3,154,903 | 11/1964 | Smith | 56/25.4 |
| 3,375,645 | 4/1968 | Miller | 56/25.4 |
| 3,469,376 | 9/1969 | Bacon . | |
| 4,313,295 | 2/1982 | Hansen et al. | 56/15.8 |
| 4,325,211 | 4/1982 | Witt et al. | 56/15.8 |
| 4,876,846 | 10/1989 | Torras | 56/11.9 |
| 4,926,621 | 5/1990 | Torras | 56/6 |
| 4,958,484 | 9/1990 | Busboom . | |
| 5,005,344 | 4/1991 | McCracken . | |
| 5,237,804 | 8/1993 | Bertling | 56/60 |
| 5,321,938 | 6/1994 | LeBlanc | 56/6 |
| 5,435,117 | 7/1995 | Eggena . | |
| 5,473,871 | 12/1995 | Fava et al. . | |

OTHER PUBLICATIONS

Kut–Kwick Owner's Manual, selected pages, Model SSM23–72, Kut–Kwick, Inc., Brunswick, Georgia date unknown.

*Primary Examiner*—H. Shackelford
*Attorney, Agent, or Firm*—Thomas, Kayden, Horstemeyer & Risley

[57] ABSTRACT

The brush cutter (10) includes a rearwardly positioned tractor (11) and a forwardly positioned cutter assembly (12). The outboard rectilinear cutting blades (49 and 51) rotate in their forward arcs toward each other and toward the longitudinal plane (28), so as to urge the cut vegetation inwardly toward the adjacent blades for mulching. The leading skirt (31) of the cutter deck (30) is positioned forwardly of the blades so as to engage and bend the taller brush and young trees in the direction of movement of the brush cutter before the lower portions of the vegetation are cut, thereby inducing the vegetation to fall in the path of the brush cutter, so that it is overrun by the brush cutter and mulched.

9 Claims, 5 Drawing Sheets

GROUND CLEARING BRUSH CUTTER AND MULCHER WITH A RIGID HEIGHT ADJUSTMENT MECHANISM

FIELD OF THE INVENTION

This invention relates to a self-propelled, rotary cutter that includes a rear riding tractor and a front cutter deck pivotally mounted to the tractor for clearing the ground of brush, small trees and other vegetation, and mulching the cut-off vegetation into small masses.

BACKGROUND OF THE INVENTION

When it is desired to cut brush, bushes, small trees and other vegetation at ground level to clear land, the typical equipment used is a self-propelled, power driven riding tractor with a rotary cutter assembly positioned either forwardly or rearwardly of the tractor. The rotary cutter assembly is moved along a cutting path to engage the vegetation to be cut.

One such prior art brush cutter machine is the skid steer tractor on which the operator rides and which includes the engine that propels the driving wheels of the tractor, and a cutter assembly positioned out front of the tractor. The cutter assembly is supported from the ground by caster wheels, and the cutter assembly is pivotally connected to the tractor about a longitudinal axis. With this arrangement, the cutter assembly and its cutter deck and cutter blades can tilt about the longitudinal axis with respect to the tractor so as to adjust for the variations in the terrain. The skid steer brush cutter of this type is found to be desirable because of its relatively low center of gravity that avoids the tipping over of the vehicle, because the cutter assembly is in front of the tractor and can be aggressively controlled by the operator, because it is rugged and adaptable to the variable terrain where this type of cutting is required, and because the front caster wheels do not require a steering linkage which would be vulnerable to damage from impact with objects in the cutting path.

The prior art skid-steer brush cutters typically have two or three rectilinear rotary cutting blades supported beneath a cutter deck and a motor and belt driving system which rotates the blades in the same direction of rotation. This tends to urge the cut vegetation out to the side of the brush cutter, where it is out of the way of the advancing vehicle. Some of the mowers are rear discharge mowers which urge the cut vegetation through the mower cutter deck without cutting the vegetation into small pieces. The rear discharge mowers utilize baffles to help direct the cut vegetation rearwardly around the blades and through the deck.

Another type brush cutter is the rotary drum cutter which has rotary drums mounted in front of the tractor with the rotating drums having their axes oriented parallel to the ground. Chippers are mounted to the face of the drum that chop up trees and brush. The chippers chop the vegetation into chips as the chippers pass over the vegetation. These are slower than rotary cutters and run slowly over trees to allow the chipper to produce an effective result.

The prior art also teaches a cutter assembly with one or more rotary cutters mounted with horizontal discs attached to the vertical shaft. Each cutter disc has relatively small cutter blades hingedly attached to the extremity of the disc with bolts. The cutter blades usually are attached with a single bolt to allow pivoting of the cutter blade when objects are hit. However, the small cutter blades also can be rigidly attached with multiple bolts. Also, these machines do not mulch very well because the discs usually do not propel the cut vegetation through the deck where it can be re-cut, as can be done by rectilinear blades. The disc cutters do not mulch well because of the discs occupying the space where mulching occurs.

The ends of the blades of both disc cutters and rectilinear blade cutters normally extend beyond the front of the cutter deck so that they are freer to cut down brush and small trees before the brush, etc. is engaged by the cutter deck. The blades typically cut near the base of the vegetation. In this design the tall vegetation tends to fall primarily toward the machine and on top of the cutter deck where the material cannot be mulched. This poses some inconvenience and possibly a hazard to the driver of the tractor and to the machine. Also, the blades tend to propel the cut brush laterally away from the on-coming cutter assembly where it cannot be mulched. In some instances, this requires the driver to back the tractor up and run over the previously cut brush, trees, etc. so as to cut them apart in smaller pieces, generally known as "mulching."

The large brush and other large vegetation cut by both the rectilinear blades and the disc blades of the prior art brush cutters is likely to be left in large pieces on the ground. Therefore, once the prior art brush cutters and their cutter assemblies have moved through a field and have cut brush and other vegetation growing in the field, usually it is desirable to have the brush cutter move back through the field so as to recut or mulch the previously cut brush, limbs, etc. Obviously, this second pass through the field requires more operator time and machine time and more fuel, and results in increased wear on the equipment and does not adequately mulch.

Further, in most of the typical prior art cutter assemblies, the cutter blades all rotate in the same direction, which tends to urge the cut brush, trees, etc. out to the side of the implement, thus removing the cut brush etc. out of the cutting path, which may be desirable in some instances so that the equipment can move faster through a field, but which retards the ability of the cutter assembly to re-cut or mulch the vegetation.

Another aspect of the prior art is the caster arm and assembly configuration. It would be desirable to be able to rapidly change the height of the cutter deck and cutter blades from the ground so that the cutting height of the rotary cutter blades would be changed to be at the correct height for cutting of smaller brush or larger brush and young trees, etc. The prior art design of casters for front mounted rotary cutters is to have the casters attached to a vertical axle and with the vertical axle mounted in a housing to allow the caster axle to rotate but to keep it in the same position relative to the machine. The height of the cutter deck is adjusted by putting spacers either over or under the housing about the axle, thereby raising or lowering the caster with respect to the cutter deck. This is used as an inexpensive way of adjusting the height of the cutter deck. However, when the caster axle is lowered to lower the wheel and raise the cutter deck, the axle extends farther out of its housing and becomes more vulnerable to bending. This trait is acceptable for mowers but not in a brush cutter application in which the brush cutter is used more aggressively to cut heavier brush, small trees, etc. When the upright axle of the caster wheel becomes bent or otherwise damaged, it is likely that the cutting operation of the brush cutter will have to be terminated and the caster wheel replaced.

Thus, it can be seen that it would be desirable to have a brush cutter suitable for cutting and mulching brush, small trees and other mid-sized vegetation which, after cutting the vegetation away from the ground surface, mulches the vegetation so that it is rendered into small particles suitable for rapid deterioration. To induce mulching of the brush, it would be desirable to cause the vegetation to be urged to fall toward the cutting path in front of the brush cutter as the lower portion of the vegetation is cut, so that the cutter assembly passes over the cut vegetation and re-cuts or mulches the vegetation without requiring the vehicle to be driven back over the initially cut vegetation. Further, it can be seen that it would be desirable to have adjustable height caster wheels for supporting the cutter deck which are heavy duty so as to withstand the rugged conditions normally encountered by such a brush cutter, and which are able to raise or lower the wheels with respect to the cutter deck to effectively lower or raise the cutter deck with respect to the ground surface, without requiring the placement of shims, etc. about the vertical shaft of the caster wheels.

SUMMARY OF THE INVENTION

Briefly described, the present invention comprises an improved ground clearing brush cutter which includes a skid steer tractor with a front mounted cutter assembly which is rigidly mounted to the tractor while being allowed to pivot with respect to the tractor about a longitudinal axis. The cutter assembly includes its own caster wheels that adjustably support the cutter assembly from the surface of the ground so as to change the height of the cutter assembly from the ground. The caster wheels are of rugged construction so as to withstand impact from trees and obstacles which is not required by grass cutting equipment.

The cutter assembly includes a cutter deck and at least two outboard rectilinear rotary cutter blades suspended beneath the cutter deck that straddle the centerline of the cutter assembly and that are driven in opposite, counter-rotation directions, with the directions of movement of the blades at the front of the cutter deck moving in arcs inwardly and toward the centerline and then rearwardly so as to cut the vegetation in the cutting path with a motion that urges the cut vegetation inwardly between the blades and rearwardly beneath the cutter deck.

The cutter assembly and its attachments are specifically arranged to engage the large brush and young trees and bend them over in front of the cutters toward the cutting path so that when they are cut adjacent the ground they fall in the cutting path of the implement, so that the cut vegetation will be run over by the cutter assembly and re-cut, so as to reduce the likelihood that the vegetation will fall over the top of the cutter assembly, tractor, etc. or outside the cutting path. This is accomplished by placement of a leading portion of the cutter assembly forwardly of cutter blades along the cutting path. The mid-sized brush, young trees, etc. thereby are pushed over by the leading portion of the cutter assembly and have the tendency to fall forwardly with respect to the implement after they have been initially cut, into the cutting path, where the vegetation will be overrun by the brush cutter and be re-cut. The counter direction of rotation of the blades, whereby the leading arcs of the blades rotate inwardly toward the centerline of the cutter assembly, causes the initially cut brush, etc. which is being overrun by the cutter assembly to be drawn between the blades and beneath the cutter deck where it is mulched and discharged rearwardly of the cutter assembly.

The height of the cutter deck from the ground can be adjusted without disturbing the vertical position of the caster axle with respect to the axle housing. In the embodiment disclosed herein the caster wheels are mounted to a U-shaped caster shaft support, and the shaft support is, in turn, supported by an upright support or housing connected to a way mounted to the cutter deck. When the height of the cutter deck and cutter blades is to be changed, the caster shaft support or housing is adjusted with respect to the cutter deck through the adjustability of its support ways, thereby effectively adjusting the relative vertical position of the caster wheels with respect to the cutter assembly.

Therefore, it is an object of the present invention to provide an improved brush cutter that includes a skid steer tractor with front mounted cutter assembly, which operates to cut and mulch brush and young trees and other mid-sized vegetation, without requiring the implement to be moved over the vegetation a second time to achieve mulching.

Another object of this invention is to provide an improved brush cutter for clearing land of vegetation of the type that includes a rear mounted tractor, a front mounted cutter assembly, and with the chassis of the tractor and the cutter deck of the cutter assembly tiltably mounted to one another about a longitudinal axis, with the cutter assembly structured to engage and bend the brush in the direction of advancement of the implement along the cutting path as the base of the brush is first cut by the cutter blades, and with the cutter blades positioned and operable to overrun the initially cut brush and re-cut the brush and to urge the cut brush to move between the cutter blades and rearwardly from the cutter deck.

Another object of this invention is to provide a brush cutter that engages brush and bends it over in preparation for cutting, and after the vegetation is cut it falls in the path of the oncoming cutter therefore causing the brush to be re-cut.

Another object of the invention is to provide a brush cutter that provides for outboard blades which rotate inwardly to draw vegetation toward the center line of the cutter deck where vegetation is re-cut and mulched.

Other objects, features and advantages of the present invention will become apparent upon reading the following specification when taken in conjunction with the accompanying drawings.

DETAILED DESCRIPTION

Figure 1:
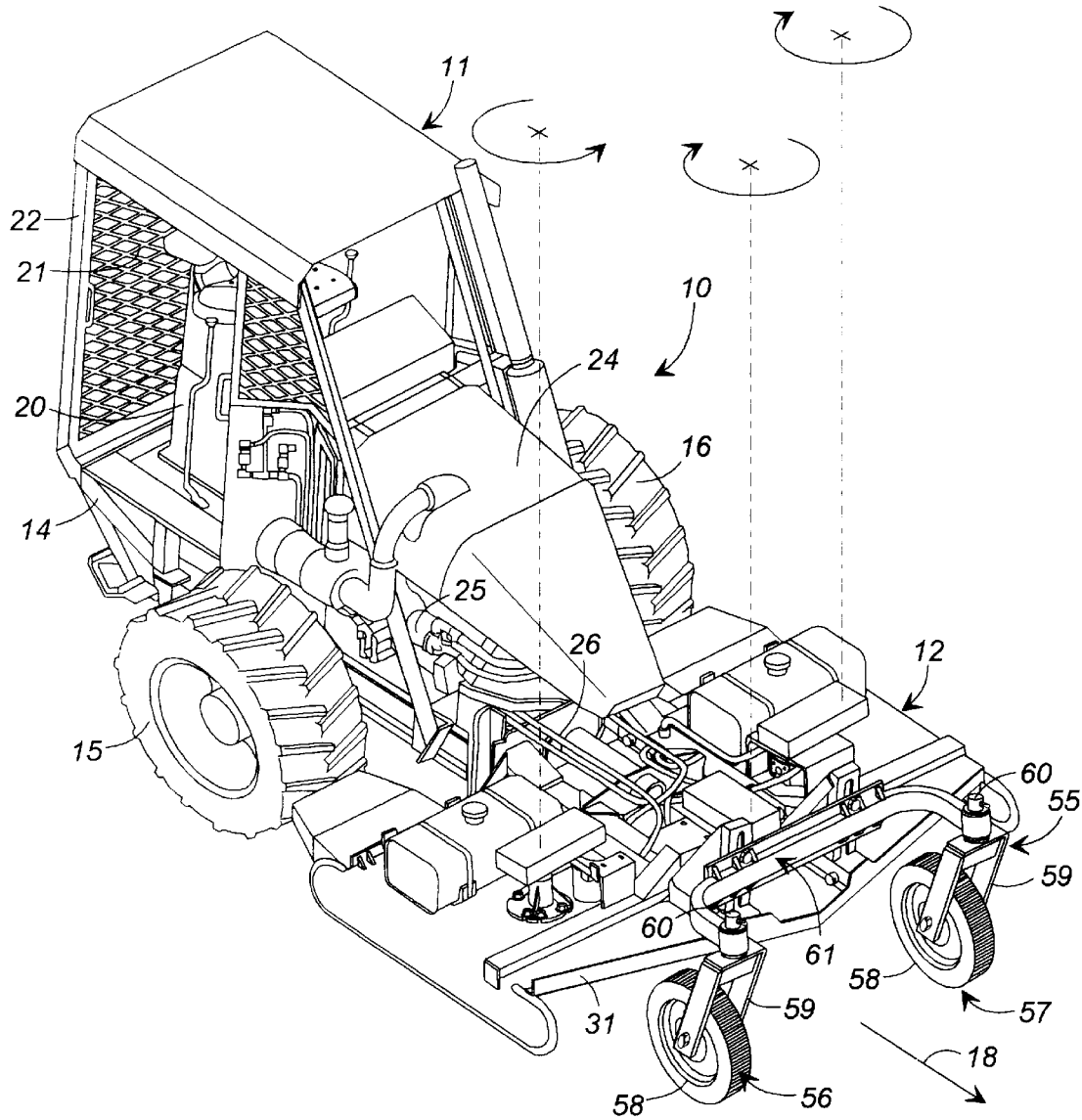
FIG. 1 is a perspective illustration of the Ground Clearing Brush Cutter and Mulcher, with direction arrows indicating the direction of rotation of the cutter blades.

Referring now in more detail to the drawings, in which like numerals indicate like parts throughout the several views, FIG. 1 illustrates, in perspective, the ground clearing brush cutter which includes a rear mounted skid steer riding tractor 11 and a front mounted cutter assembly 12. The tractor 11 includes a chassis 14, a pair of side mounted driving wheels 15 and 16 that straddle the chassis of the tractor. The tractor 11 includes a driver's seat 20, driver's cage 21 with roll bar structure 22. The tractor wheels 15 and 16 are individually controlled in the conventional manner, so as to guide the tractor in a conventional skid-steer arrangement. The engine which powers the driving wheels 15 and 16 is located beneath the engine hood 24 and the engine and side mounted wheels 15 and 16 and associated components function as a power means for advancing the tractor 11 and cutter assembly 12 in a forward direction along the cutting path 18. A hydraulic pump 25 is driven by the engine, and its hoses 26 are connected to the hydraulic motors (to be described later) that are mounted on the cutter assembly 12 and which rotate the cutter blades.

Figure 2:
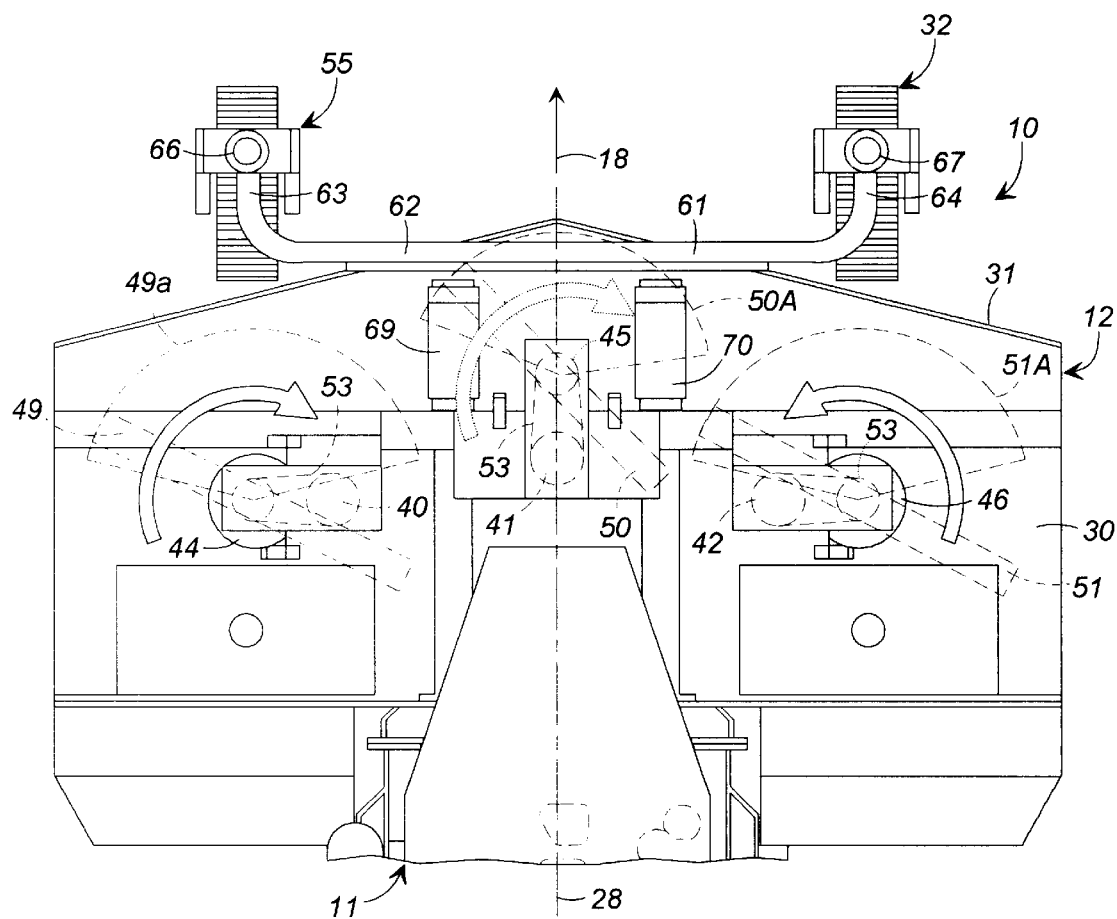
FIG. 2 is a top view of the cutter assembly, showing the direction or rotation of the cutter blades.

As illustrated in FIG. 2, the tractor 11 and cutter assembly 12 define a longitudinal, upwardly extending plane 28, which includes the longitudinal axis of the tractor and cutter assembly which is also indicated by arrow 18, and several of the operative elements of the brush cutter 10 are duplicated on opposite sides of the longitudinal plane 28.

Cutter assembly 12 includes a cutter deck 30 that supports the components of the cutter assembly and an upwardly turned brush pusher skirt 31 positioned at the forward edge of the deck, and caster wheel assembly 32 is mounted to the forward portion of the cutter deck for supporting the cutter assembly from the ground surface beneath the cutter assembly.

Figure 3:
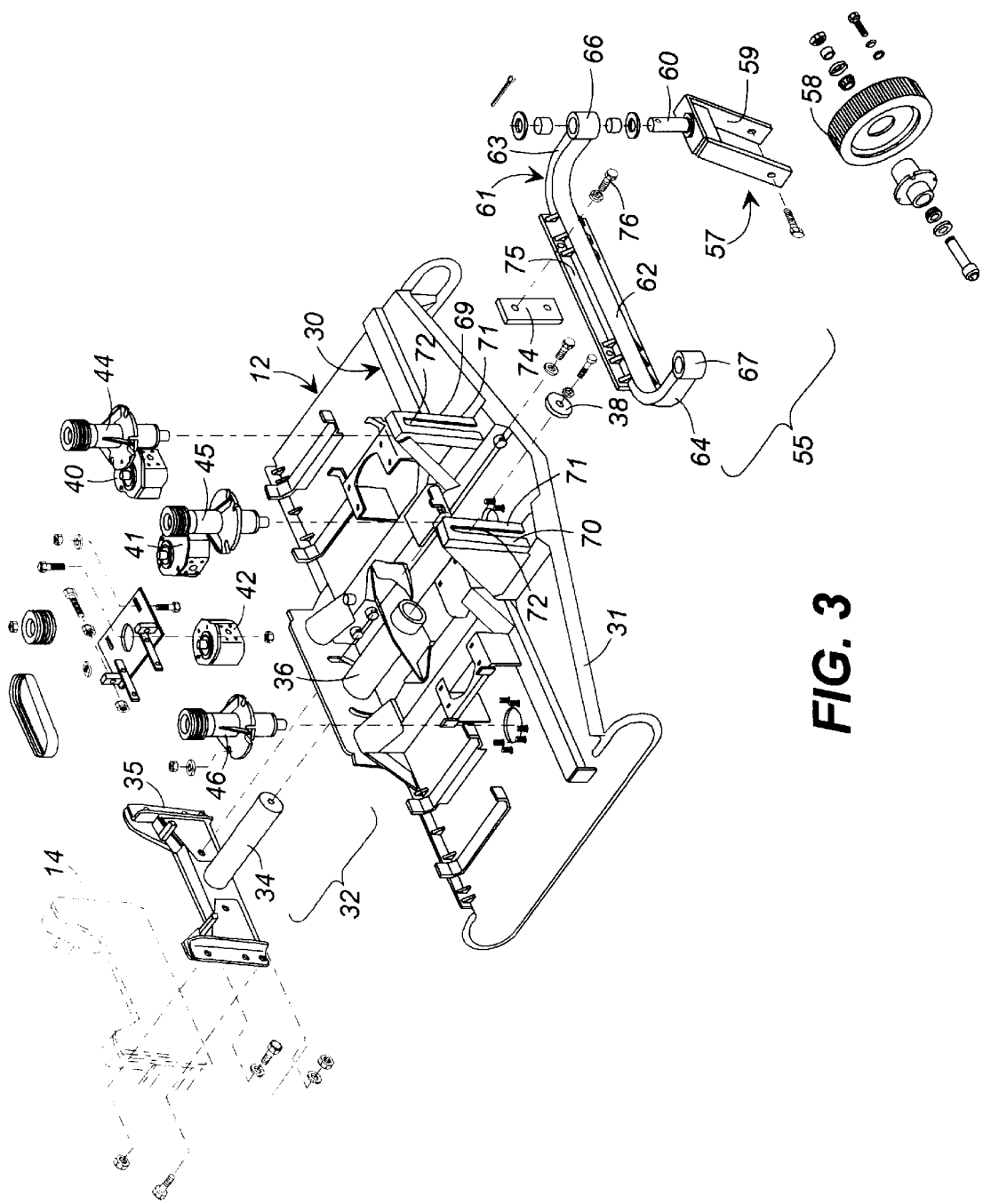
FIG. 3 is an exploded perspective illustration of the cutter assembly.

As illustrated in FIG. 3, a pivot connector 32 connects the cutter assembly 12 to the chassis 14 of the tractor and includes cylindrical pivot bar 34 that is mounted at one of its ends to the mounting plate assembly 35 which is, in turn, mounted by bolts to the chassis 14. The pivot bar 34 has its axis parallel to the longitudinal plane 28 (FIG. 2). Pivot tube 36 is rigidly mounted to the cutter deck 30 and is telescopically mounted about pivot bar 34 of the tractor. Retaining washer 38 and its screws hold the pivot bar in the pivot tube 36 so that the cutter assembly 12 is tiltably mounted to the tractor 11.

As illustrated in FIG. 3, hydraulic motors 40, 41 and 42 are mounted to cutter deck 30 and are connected by the hydraulic lines 26 to the pump 25 of tractor 11. The motors 40–42 are connected by drive belts (not shown) to cutter blade mandrel assemblies 44, 45, and 46, respectively, all of which are mounted to the cutter deck 30. Rectilinear cutter blades 49, 50 and 51 (FIG. 2) are positioned beneath the cutter deck 30 and are mounted to the cutter blade mandrel assemblies 44–46. The motors 40–42 are reversible hydraulic motors, and the cutter blades are sharpened on opposite edges of each end to cut in either direction of rotation. FIGS. 1 and 2 illustrate the rectilinear cutter blades 49–51 being rotated so that the outboard cutter blades 49 and 51 are being rotated in a direction such that their leading arc of rotation that faces in the direction of the cutting path 18 move toward the longitudinal cutting plane 28, thereby urging the brush being cut by the blades 49 and 51 to move to the center of the cutter assembly 12.

It will be noted that the blades 49, 50 and 51 are elongated, double end, single piece rectilinear blades, as opposed to the blades that are sometimes used with brush cutters, which have a large central disk with small cutting elements attached to the periphery of the disks. The prior art cutters with the large central disks operate to cut and urge the cut brush generally at a tangent with respect to the disks, which has the tendency of retarding the movement of the cut brush between adjacent ones of the blades. However, in the invention herein disclosed, the use of the relatively thin, rectilinear blades 49, 50 and 51 provides room for the cut brush to be moved between adjacent ones of the counter rotating blades, such as between blades 50 and 51, where the cut brush can be re-cut as it passes between the blades, and the cut brush usually is urged rearwardly beneath the cutter deck 30, to be passed over by the following tractor 11.

Although the rectilinear blades 49, 50 and 51 are illustrated as one piece blades, it should be understood that multiple part blades can be used, or blades of other configurations can be used as long as the cut vegetation can be effectively mulched as it passes between the blades and under the cutting deck.

As illustrated in FIG. 2, the outboard cutter blades 49 and 51 have their cutting paths overlap middle cutter blade 50 so that there will be no uncut gap left in the vegetation of the cutting path.

While three cutter blades 49, 50 and 51 have been illustrated in the embodiment disclosed herein, the ground clearing brush cutter 10 can be constructed with other combinations of blades, such as two blades, four blades, or even more blades. The use of three blades takes advantage of the staggered relationship of blades so as to avoid gaps in the cutting swath formed in the vegetation, and the use of at least two blades takes advantage of the ability of the outboard blades to rotate so that their leading arcs move toward the longitudinal plane 28, tending to urge the cut brush inwardly beneath the cutter deck where there is a reasonable likelihood that the brush will be re-cut and therefore mulched as it is passed rearwardly between the outboard blades and the middle blade.

As previously stated, the hydraulic motors 40, 41 and 42 are reversible, so that the outboard cutter blades 49 and 51 can rotate in the direction opposite to that illustrated in FIGS. 1 and 2, so that the brush being cut by the outboard blades is urged laterally, out to the side of the cutter assembly 12, so as to avoid re-cutting or mulching of the brush. The cutter blades are double edged in that they have sharpened edges on both the leading and trailing peripheral edges, so that they can be operated in either direction for cutting purposes. When the brush cutter is being operated in this manner, less energy is required to cut the brush since there is little, if any, re-cutting of the brush that takes place. Further, it is usually possible to advance the brush cutter at a higher velocity through the field if the brush is being cut only once and is urged laterally away from the cutter assembly.

As illustrated in FIGS. 1 and 3, the cutter assembly 12 is supported at its forward edge by caster wheel assembly 55. Caster wheel assembly 55 includes a pair of caster wheel units 56 and 57 which straddle the longitudinal plane 28 and engage the ground surface and support the cutter assembly 12. Each caster wheel unit 56 and 57 includes a wheel 58 having a wheel housing 59, and an upwardly extending pivot shaft 60. A U-shaped caster support 61 includes a base leg 62 and a pair of parallel end legs 63 and 64 mounted at the ends of base leg 62, with the end legs extending in the forward direction of movement of the brush cutter 10. Caster housings 66 and 67 are formed at the distal ends of the end legs 63 and 64 and pivotally support the shafts 60 of the caster wheel assemblies 55.

FIG. 2 also provides an illustration of the spaced support struts 69 and 70 for adjusting the height of caster housings 66 and 67. In FIG. 2 the support struts 69 and 70 adjust the base leg 62 to which the caster housings 66 and 67 are fixed. In other applications the support struts 69 and 70 for vertical adjustment would connect directly at the caster housings 66 and 67 and eliminate the base leg 62.

As best illustrated in FIG. 3, the pair of spaced support struts 69 and 70 are rigidly mounted to the upper surface of cutter deck 30 and function as mounting means to support the U-shaped caster support 61. Each strut 69 and 70 includes a vertical way 71 that defines a vertical slot 72. A holding plate 74 is placed behind the way 71, and a mounting bracket 75 which is rigidly attached to the base leg 62 of the U-shaped caster support 61 is applied in flat, facing contact with each way 71, and a bolt 76 extends through aligned openings of the mounting bracket 75, way 71, and then through the holding plate 74. This slidably attaches the caster wheel assembly 55 to the cutter deck 30. Once the desired height of the cutter deck has been achieved, the bolts 76 are tightened to rigidly connect the caster wheel assembly 55 to the cutter deck.

Should it be desired to change the height of the cutter deck from the ground, the bolts 76 of the caster wheel assembly 55 can be loosened and the caster wheel assembly slid upwardly or downwardly with respect to its ways 71, and the bolts re-tightened to establish the new height. This may be important in situations where the brush cutter is to be used in a field where larger than normal brush is to be cleared, particularly when young trees are to be cut and it is desirable to cut higher from the ground surface. Also, the reverse adjustment of the cutter height may be desired when the field to be cut bears smaller vegetation.

It will be noted from FIG. 2 that the cutter blades 49, 50 and 51 are constructed and arranged so that substantially their entire forward facing cutting arcs 49A, 50A and 51A are located beneath the cutter deck 30. The upwardly turned brush pusher skirt 31 of the cutter deck is at a height above the cutter blades and the ground so that it usually engages the brush before the cutter blades 49–51 engage and cut the brush. The skirt 31 therefore functions as brush engaging means for bending the brush over in the direction of movement of the brush cutter 10. Other forms and shapes of the skirt 31 can be used for this function. When the blades first cut the brush, the brush, being bent over in the direction of movement of the brush cutter tends to fall to the ground in the cutting path of the brush cutter, so that the cutter assembly 12 will pass over the cut brush. As the cutter assembly passes over the cut brush, it re-cuts the brush and generally urges the brush in the directions as indicated by the arrows of FIG. 2, so that the outboard cutter blades 49 and 51 urge the brush toward the longitudinal plane 28 of the brush cutter. This causes the brush to be urged toward an adjacent cutter blade where the brush will be re-cut and mulched. The use of rectilinear cutter blades provides space in the arcs of movement of the cutter blades, so that the brush that is being cut and re-cut has space to move adjacent the cutter blades and between adjacent ones of the cutter blades, allowing the re-cut brush to be urged rearwardly between the blades to exit at the rear of the cutter assembly 12.

In addition to the skirt 31 of the cutter deck engaging and bending over the brush toward the cutting path, the U-shaped caster support 61 of the caster wheel assembly 55 is positioned so it will function as a brush engaging means to engage the larger vegetation and bend it toward the direction of movement of the cutter assembly before and after the cutter blades cut the vegetation. Also, the U-shaped caster support 61 helps to keep tall vegetation from falling onto the cutter deck 30.

Figure 4A:
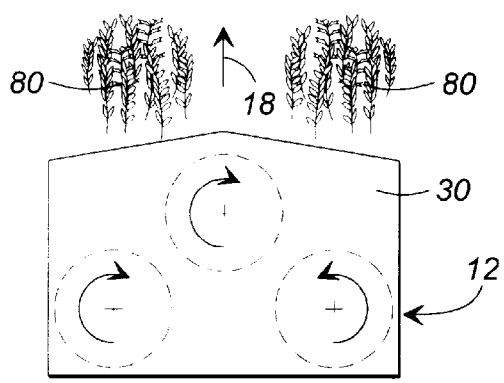
FIGS. 4A–4D are progressive schematic illustrations of the cutter assembly, showing how the blades rotate to urge the brush to be moved under the cutter assembly where it is recut into small particles and discharged rearwardly of the cutter assembly.
Figure 4B:
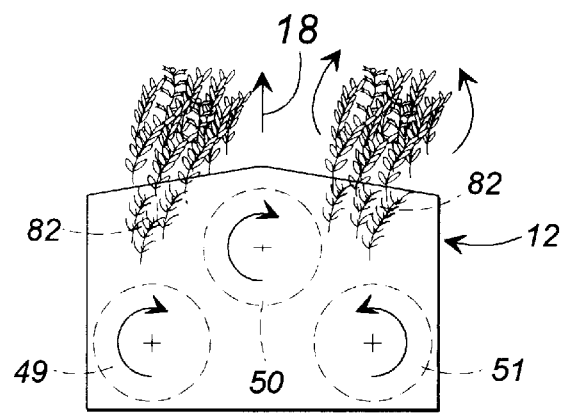
Figure 4C:
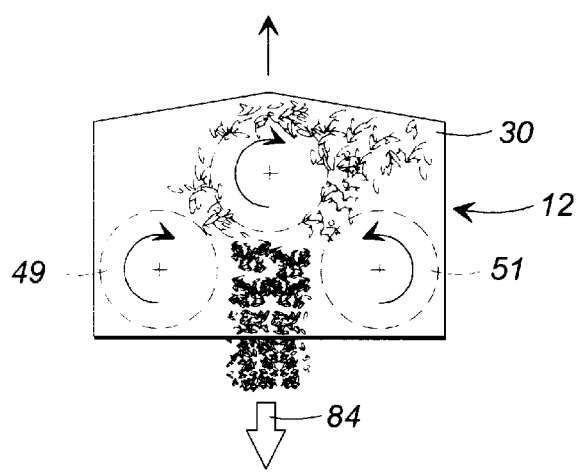
Figure 4D:
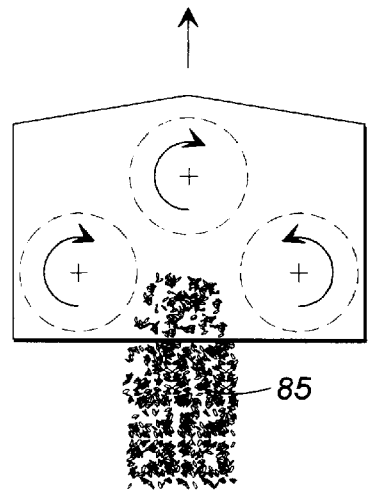

As illustrated in FIGS. 4A and 4B, the cutter deck 30 tends to move into engagement with brush 80 and 81 and tends to tilt the brush (FIG. 4B) in the direction of movement as indicated by arrow 18, where the stems 82 of the brush are first cut by the cutter blades 49, 50 and 51. After the brush has been cut from the ground, it falls to the ground in the path 18 and the cutter assembly moves over the fallen brush and re-cuts the brush (FIG. 4C). The outboard cutter blades 49 and 51 urge the brush toward the longitudinal center line (FIG. 4C), where the brush is urged rearwardly beneath the cutter deck 30 and discharged as indicated by direction arrow 84. As illustrated in FIG. 4D, the cut brush 85, having been cut and re-cut, falls in small pieces to the ground and lies in the cutting path behind the brush cutter.

Figure 5A:
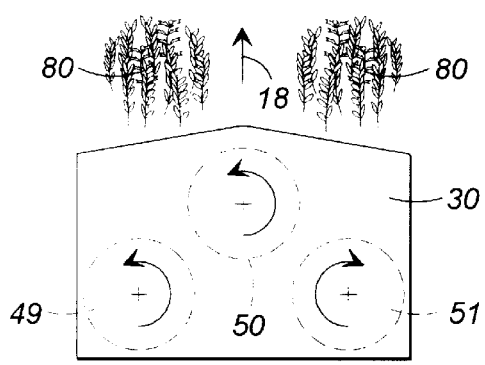
FIGS. 5A–5D are progressive schematic illustrations, similar to FIGS. 4A–4D, but showing the cutter blades rotating in a reverse direction, whereby the brush is cut and expelled to the outside of the cutter assembly for rapid cutting, not mulching.
Figure 5B:
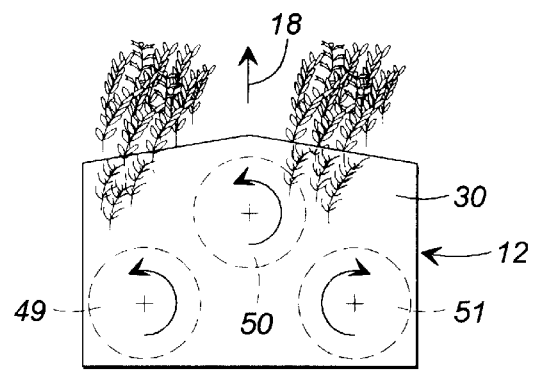
Figure 5C:
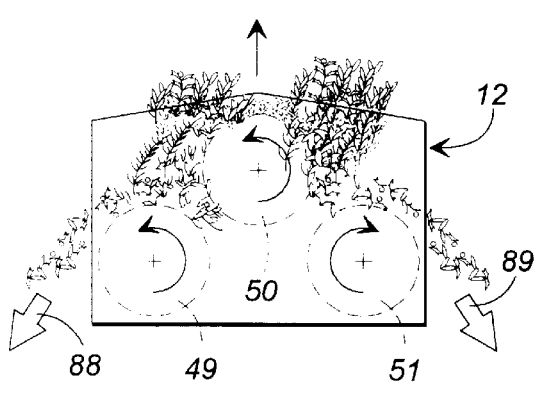
Figure 5D:
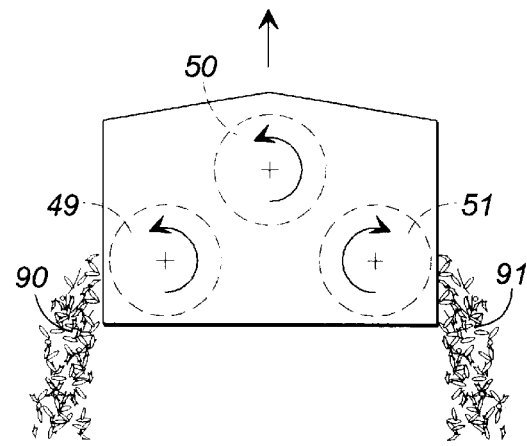

When the motors 40, 41 and 42 of the brush cutter are reversed, thereby reversing the direction of rotation of the cutter blades 49, 50 and 51, as indicated in FIGS. 5A–5D, the cutter deck 30 again bends the brush 80 over into the path 18 of the brush cutter (FIG. 5B) and cuts the brush at its base, whereupon the brush falls to the ground in front of the brush cutter. When the cutter assembly 12 passes over the fallen brush, it cuts the brush and moves it laterally, as indicated by direction arrows 88 and 89. This forms the brush into trails 90 and 91, as indicated in FIG. 5D, with the brush having been only minimally re-cut and substantially not mulched. This provides for rapid cutting but not mulching. With the leading arcs of the cutter blades 49 and 51 rotating outwardly, mulching is reduced and the material is no longer congested under the cutter deck 30 while being mulched. Moving the material to the outside reduces the power required for cutting and eliminating the power required for mulching thereby allowing the machine to cut substantially faster.

While the foregoing description discloses a preferred embodiment of the invention, it will be understood by those skilled in the art that variations and modifications thereof can be made without departing from the spirit and scope of the invention as set forth in the following claims.

What is claimed is:

1. A ground clearing apparatus for cutting and mulching brush and other vegetation growing from the ground surface, comprising:

a skid steer tractor including a chassis defining an upwardly extending longitudinal plane;

driving wheels positioned on opposite sides of said longitudinal plane and rotatably mounted to said chassis for engaging the ground and moving the tractor in a forward direction along a cutting path approximately parallel to said longitudinal plane;

a cutter assembly positioned in front of said tractor and straddling said longitudinal plane;

connector means pivotally connecting said cutter assembly to said tractor about an axis parallel to said longitudinal plane;

caster wheels mounted to said cutter assembly and straddling said longitudinal plane for engaging the ground and supporting said cutter assembly from the ground;

said cutter assembly including a cutter deck and outboard rectilinear cutter blades mounted to and suspended from said cutter deck and straddling said longitudinal plane and adapted to cut brush beneath said cutter deck;

said cutter assembly including cutter blade drive means mounted on said cutter deck and adapted to counter rotate said outboard rectilinear cutter blades with respect to each other with the portions of said cutter blades extending in the direction of movement of said cutter deck moving in an arcuate path toward the longitudinal plane of said cutter assembly for cutting brush in the path of the apparatus and for urging the cut brush between the cutter blades where the cut brush is re-cut by said rectilinear cutter blades and the re-cut brush is urged rearwardly from said cutter deck;

said cutter assembly including brush engaging means positioned at a height for engaging and bending over the brush in the cutting path as the cutter deck advances along said cutting path before the brush is cut by said cutter blades;

said caster wheels each including an upwardly extending pivot shaft;

said brush engaging means comprising a caster support pivotally supporting said caster pivot shafts;

mounting means on said cutter deck for supporting said caster support and including adjustment means for vertically adjusting said caster support with respect to said mounting means and said cutter deck for adjusting the height of said cutter deck above the ground below the cutter deck;

whereby said brush engaging means engages brush in the cutting path in front of said cutter assembly as the cutter assembly advances along the cutting path and bends the brush in the direction of movement of said cutter assembly, said cutter blades cut the bent brush in the cutting path, said cutter assembly advances over the cut brush in the cutter path and said rectilinear cutter blades re-cut the cut brush and urge the cut brush between the rectilinear cutter blades rearwardly beneath said tractor.

2. The apparatus of claim 1, and wherein:

said caster support is U-shaped and includes a base arm connected to said caster support mounting means, and a pair of parallel end arms at the ends of said base arm extending forwardly of said cutter deck and pivotally supporting said caster shafts.

3. The apparatus of claim 2, and wherein said U-shaped caster support is positioned above said cutter deck and at the leading edge of said cutter deck at a height suitable for engaging brush and urging brush forwardly of said cutter deck as the brush is being cut by said cutter blades.

4. A ground clearing apparatus for cutting and mulching brush and other vegetation growing from the ground surface, comprising:

a skid steer tractor including a chassis defining an upwardly extending longitudinal plane;

driving wheels positioned on opposite sides of said longitudinal plane and rotatably mounted to said chassis for engaging the ground and moving the tractor in a forward direction along a cutting path approximately parallel to said longitudinal plane;

a cutter assembly positioned in front of said tractor and straddling said longitudinal plane;

connector means pivotally connecting said cutter assembly to said tractor about an axis parallel to said longitudinal plane;

caster wheels mounted to said cutter assembly and straddling said longitudinal plane for engaging the ground and supporting said cutter assembly from the ground;

said cutter assembly including a cutter deck and outboard rectilinear cutter blades mounted to and suspended from said cutter deck and straddling said longitudinal plane and adapted to cut brush beneath said cutter deck;

said cutter assembly including cutter blade drive means mounted on said cutter deck and adapted to counter rotate said outboard rectilinear cutter blades with respect to each other, with the portions of the cutter blades facing the forward direction of movement of said cutter deck moving toward the center plane of said cutter assembly so that the cutter blades cut the brush in the cutting path of the apparatus and urge the cut brush between the cutter blades where the cut brush is re-cut by said rectilinear cutter blades and the re-cut brush is urged rearwardly from said cutter deck;

said cutter assembly including brush engaging means positioned at a height for engaging and bending over the brush in the cutting path as the cutter deck advances along said cutting path before the brush is cut by said cutter blades;

whereby said brush engaging means engages brush in the cutting path in front of said cutter assembly as the cutter assembly advances along the cutting path and bends the brush in the direction of movement of said cutter assembly, said cutter blades cut the bent brush in the cutting path, said cutter assembly advances over the cut brush in the cutter path and said rectilinear cutter blades re-cut the cut brush and urge the cut brush between the rectilinear cutter blades rearwardly beneath said tractor.

5. Ground clearing apparatus for cutting brush and other vegetation growing from the ground surface, comprising:

a skid steer tractor and a cutter assembly;

said skid steer tractor including a chassis defining an upwardly extending longitudinal plane;

driving wheels positioned on opposite sides of said longitudinal plane and rotatably mounted to said chassis for engaging the ground and advancing the tractor in a forward direction along a cutting path approximately parallel to said longitudinal plane;

said cutter assembly positioned in front of said tractor and including a cutter deck;

connector means pivotally connecting said cutter assembly to said tractor about an axis parallel to said longitudinal plane;

rectilinear rotary cutter blades positioned beneath said cutter deck and straddling said longitudinal vertical plane for cutting brush beneath said cutter deck;

motor means positioned above said cutter deck adapted to counter rotate said cutter blades in directions for urging the cut brush rearwardly between said cutter blades;

caster wheels mounted to said cutter deck and supporting said cutter deck from the ground beneath the cutter deck, each of said caster wheels including an upwardly extending castor pivot shaft, and a support wheel pivotal about said pivot shaft;

a castor support pivotally supporting said castor pivot shafts; and mounting means mounted to said cutter deck and supporting said castor support and including adjustment means for vertically adjusting said castor support with respect to said cutter deck for changing the height of said cutter deck above the ground beneath the cutter deck.

6. The apparatus of claim 5, and wherein:

said castor support is U-shaped and includes a base arm connected to said mounting means, and a pair of parallel end arms extending forwardly of said cutter deck and supporting said caster shafts.

7. The apparatus of claim 6, and wherein:

said castor support mounting means comprises a pair of ways straddling said longitudinal plane and mounted to said cutter deck and each defining a vertical slot, and a connector extending through the vertical slot of each way and adjustably connecting each way to said axle support.

8. Ground clearing apparatus for cutting brush and other vegetation growing from the ground surface, comprising:

a skid steer tractor and a cutter assembly;

said skid steer tractor including a chassis defining an upwardly extending longitudinal plane;

driving wheels positioned on opposite sides of said longitudinal plane and rotatable mounted to said chassis for engaging the ground and advancing the tractor in a forward direction along a cutting path approximately parallel to said longitudinal plane;

said cutter assembly positioned in front of said tractor and including a cutter deck;

connector means pivotally connecting said cutter assembly to said tractor about an axis parallel to said longitudinal plane;

rectilinear rotary cutter blades positioned beneath said cutter deck and straddling said longitudinal vertical plane for cutting brush beneath said cutter deck;

power means positioned above said cutter deck adapted to counter rotate said cutter blades in directions to urge the cut brush between and rearwardly of said cutter blades;

caster wheels mounted to said cutter deck and supporting said cutter deck from the ground beneath the cutter deck, each of said caster wheels including an upwardly extending castor pivot shaft, and a support wheel pivotal about said pivot shaft;

a castor support pivotally supporting said castor pivot shafts;

mounting means mounted to said cutter deck and supporting said castor support and including adjustment means for vertically adjusting said castor support with respect to said cutter deck for changing the height of said cutter deck above the ground beneath the cutter deck; and said cutter deck including a forwardly facing upwardly extending skirt positioned forwardly of said cutter blades for engaging brush in the cutting path of said cutter deck and bending the brush forwardly as said cutter blades cut the brush.

9. A method of cutting and mulching brush and other vegetation growing from the ground surface, comprising the steps of:

advancing a skid steer tractor along a cutting path with the tractor having a front pivotally mounted cutter assembly having a cutter deck and cutter blades suspended beneath the cutter deck;

engaging the brush in the cutting path with a U-shaped brush engaging means mounted on the cutter deck and positioned forwardly of and above the cutter deck and having side legs extending forwardly of the cutter deck and a base leg extending laterally of and behind the side legs;

bending the brush in the direction of movement of the cutter assembly with the U-shaped brush engaging means;

cutting the bent brush so that the bent brush tends to fall in the cutting path ahead of the cutter assembly;

advancing the cutter assembly over the cut brush in the cutting path;

re-cutting the brush beneath the cutter assembly with a pair of outboard counter rotating rectilinear cutting blades of the cutter assembly that have their forward portions moving in an arc toward the center line of the cutter assembly; and urging the re-cut brush with the cutter blades rearwardly and between the cutter blades and along the longitudinal plane and beneath the tractor.

* * * * *